United States Patent [19]

Wenger et al.

[11] Patent Number: 5,783,240
[45] Date of Patent: Jul. 21, 1998

[54] METHOD OF PRODUCING HIGH PROTEIN, HIGH FAT SINKING AQUATIC FEED

[75] Inventors: Lavon G. Wenger; Bobbie W. Hauck, both of Sabetha; Elmer J. Osterhaus, Senaca, all of Kans.

[73] Assignee: Wenger Manufacturing, Inc., Sabetha, Kans.

[21] Appl. No.: 733,118

[22] Filed: Oct. 16, 1996

[51] Int. Cl.$^6$ .................................................. A23K 1/00
[52] U.S. Cl. ............................ 426/231; 426/516; 426/805
[58] Field of Search ................................. 426/231, 805, 426/643, 516, 1

[56] References Cited

U.S. PATENT DOCUMENTS 4,981,711  1/1991  Kearns et al. ............................ 426/805

OTHER PUBLICATIONS

Dialog Data Base, File 351, Dialog Acc. No. 004068642, Abstracting German patent application DE 3306027 A.

*Primary Examiner*—George Yeung
*Attorney, Agent, or Firm*—Hovey, Williams, Timmons & Collins

[57] ABSTRACT

A method of producing extrudates such as high protein, high fat sinking aquatic feeds is provided wherein a high protein starting material is initially preconditioned and passed through an extruder; in the extruder barrel a zone of reduced pressure is created upstream of the die for densifying the final extrudate. Fat may be added to the starting mixture at any desired point in the process, and/or may be added as a surface coating to the final extrudate. Preferably, the method further involves measuring a density value of the extrudate such as bulk density, and adjusting the magnitude of the reduced pressure conditions in the barrel in response to such measurement.

17 Claims, 1 Drawing Sheet

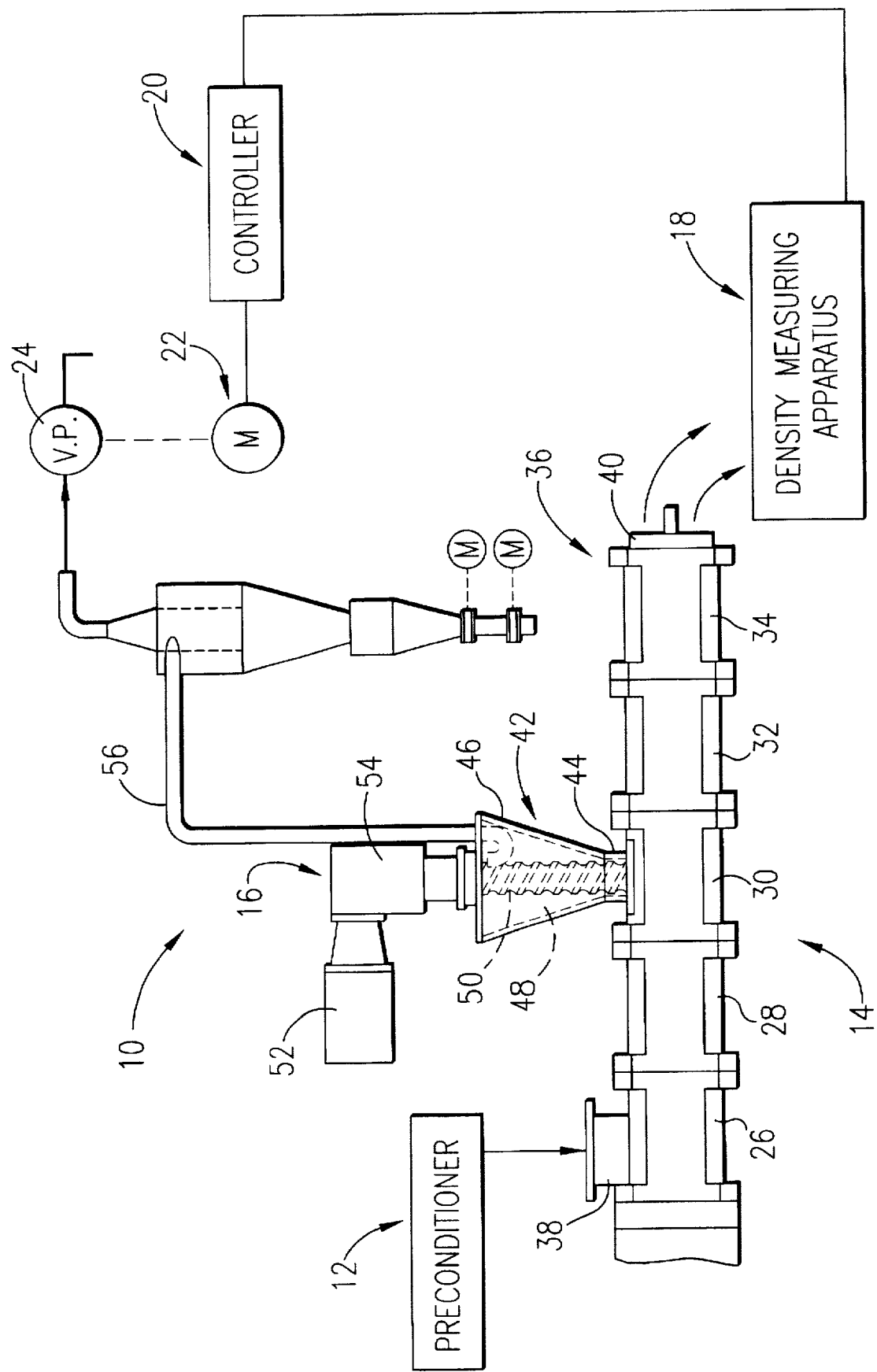

5,783,240

METHOD OF PRODUCING HIGH PROTEIN, HIGH FAT SINKING AQUATIC FEED

BACKGROUND OF THE INVENTION

1. Field of the Invention

The present invention is broadly concerned with a method of preparing high protein, high fat sinking aquatic feed products useful in aquatic farming operations for efficient growth of fish. More particularly, the invention pertains to such methods wherein a proteinaceous starting mixture is preconditioned and extruded with a zone of reduced pressure along the length of the extruder barrel for densification of the final extrudate; the method further includes the step of adding fat to the starting material or extrudate so that the final product has a total fat content of from about 10–40% by weight.

2. Description of the Prior Art

Aquatic farming is increasingly becoming a major industry, especially in light of the increasing consumer demand for fish and fish products. To give but one example, salmon are often raised in confined sea water ponds and fed specialized diets designed to maximize growth. In it is known that salmon feeds should have a very high fat content for most efficient fish growth. At the same time, an effective feed must have a specific gravity of greater than 1 so that it will sink, and must have appropriate hardness and other qualities which will induce salmon to eat the feed.

It has been known in the past to provide relatively large extruded pellets having high protein and oil contents for use in salmon farming. However, these pellets have been produced using small, low capacity equipment and techniques which render the product very expensive. There is accordingly a need in the art for more efficient techniques for producing high protein, high fat sinking aquatic feeds which can be carried out on a high volume basis to reduce feed costs and which give consistent feed properties.

SUMMARY OF THE INVENTION

The present invention overcomes the problems outlined above and provides an efficient, high-output process for the production of large diameter, high protein, high fat sinking aquatic feeds with integrity. Broadly speaking, the method involves first providing a starting mixture, including 15–55% by weight protein (more preferably from about 25–45% by weight protein) and at least about 1% by weight starch (most preferably from about 7–15% by weight starch). This starting mixture is first preconditioned by adding moisture thereto and subjecting the starting mixture to conditions of elevated temperature and agitation. Thereupon, the preconditioned starting mixture is fed into and through an extruder having an elongated barrel and an elongated, axially rotatable, flighted screw therein with an endmost extrusion die. This treatment forms self-sustaining extrudate having a specific gravity of greater than 1. During passage of the preconditioned starting mixture through the extruder, a condition of reduced pressure is created within the barrel upstream of the die for densifying the preconditioned starting mixture. Furthermore, the overall method involves the step of adding fat to the starting mixture and/or the final extrudate so that the latter has a total fat content of from about 10–40% by weight. Thus, liquid fat may be added to the starting mixture initially, during preconditioning or during passage through the extruder barrel; also, fat may be applied directly to the extrudate after passage through the extrusion die.

In particularly preferred forms, the method includes the step of measuring a density value of the extrudate emerging from the extruder and adjusting the magnitude of the reduced pressure conditions within the extruder barrel in response to such measurement. Normally, the bulk density of the extrudate would be measured and this data used as a guide for alteration of the pressure conditions within the extruder barrel.

During the preconditioning step, the starting mixture is subjected to a temperature of from about 75°–98° C. (more preferably from about 90°–97° C.) for a period of from about 150–200 seconds (more preferably from about 170–190 seconds). The purpose of preconditioning is to initially moisture and partially cook the starting material prior to entrance thereof into the extruder barrel. Advantageously, the material leaving the preconditioner has a moisture content of from about 20–60% by weight, and more preferably from about 21–23% by weight.

In the extruder, the preconditioned starting material is subjected to conditions of elevated heat, pressure and shear. Normally, the temperature conditions in the barrel are such as to achieve a maximum temperature of from about 50°–95° C., and more preferably from about 65°–80° F. Normal maximum pressure conditions are from about 100–500 psi, and more preferably from about 150–300 psi. The preferred temperature profile within the extruder barrel is such that the preconditioned starting material is heated to a temperature maximum just prior to reaching the zone of reduced pressure. Thereafter, the temperature of the material is generally reduced and the region of the barrel downstream from the reduced pressure zone is a forming region where the material is compacted prior to ultimate extrusion.

The reduced pressure zone of the extruder barrel is normally created by drawing a partial vacuum therein. Such partial vacuum typically has a magnitude of from about 2–15 in. $H_2O$ and more preferably from about 7–13 in. $H_2O$.

After extrusion, the extrudate may be dried using any convenient means such as a multiple-pass dryer/cooler. The moisture content of the extrudate as it emerges from the die is normally from about 25–32% by weight, and more preferably from about 27–29% by weight.

As explained above, the method of the invention preferably involves the step of measuring a density value of extrudate and adjusting the magnitude of the reduced pressure conditions within the barrel in response to such measurement(s). It will be appreciated that this technique is not limited to the production of high protein, high fat extrudates, but can be used to good effect in a wide variety of extrusion technologies where density control is considered important. Thus, this aspect of the invention involves providing a starting mixture for extrusion which is subsequently passed into and through an extruder and extrusion die while creating a condition of reduced pressure at a zone along the length and within the barrel upstream of the die. The density value (preferably bulk density) of the extrudate is used as a guide to adjust the reduced pressure conditions within the barrel zone.

BRIEF DESCRIPTION OF THE DRAWING

The single FIGURE is an essentially schematic illustration of the preferred extrusion system used in the production of the feeds of the invention.

DETAILED DESCRIPTION OF THE PREFERRED EMBODIMENTS

In general, the preferred equipment used in carrying out the invention (see the FIGURE) includes an extrusion system 10 broadly comprising a preconditioner 12, and a 5-head extruder 14 equipped with a mid-barrel vent/vacuum device 16. Preferably, the overall system 10 includes density value measuring apparatus 18 operably coupled with a microprocessor controller 20, the latter operating a motor 22 in turn coupled with vacuum pump 24; as shown, the vacuum pump 24 is operably connected with the device 16.

In more detail, the preconditioner 12 is a Wenger DDC pre-conditioner (Wenger Manufacturing, Inc., Sabetha, Kans.) of the type described in U.S. Pat. No. 4,752,139, which is incorporated by reference herein. The purpose of preconditioner 12 is to moisten and initially cook to a limited degree the starting dry ingredients, as is well understood in the art. In addition, in preferred forms, fish oil may be injected into the preconditioner and mixed with the dry ingredients together with water and steam. As shown, the outlet of the preconditioner feeds directly to the inlet of extruder 14.

In the form shown, extruder 14 is a Wenger TX85 twin screw extruder including a total of five interconnected tubular heads 26–34 defining an elongated, tubular barrel 36, as well as a pair of intermeshing, axially rotatable, powered flighted screws (not shown) within the barrel 36. The extruder is of the type described in U.S. Pat. No. 4,875,847, incorporated by reference herein. In more detail, the extruder 14 includes inlet head 26 having an upright material inlet 38 operatively coupled with the outlet of preconditioner 12. The third head 30 is apertured and supports device 16. Outlet head 34 is equipped with a multi-orifice die 40 as shown. The heads 28–34 are equipped with external jackets for the circulation of heating or cooling media; moreover, these heads are also provided with ports for the direct injection of steam and/or moisture into the extruder barrel.

In use, the flighted auger screws within barrel 36 are rotated in order to transport incoming preconditioned material from inlet 38 to and through the restricted orifices of die 40. During such movement, the material is subjected to increasing levels of temperature, pressure and shear in order to cook the product to the desired extent and form the extrudate into a desired shape. To this end, extrusion apparatus of this type is also normally equipped with rotating knife structure (not shown) adjacent die 40 which serves to subdivide the extrudate emerging from the die orifices.

The device 16 is a vent/vacuum apparatus adapted for drawing gas from the extruder barrel 36 during operation of extruder 14. The device 16 is fully described in U.S. Pat. No. 4,763,569, incorporated by reference herein. Briefly, however, the device 16 includes an upright housing 42 including a lowermost cylindrical portion 44 operably secured to head 30, as well as an upper conical portion 46.

When mounted on head 30, the interior 48 of housing 42 is in communication with the interior of barrel 36. The overall device 16 further includes an upright internal screw 50 within housing 42. The screw 50 is flighted and serves to substantially prevent entrance of solid material from barrel 36 into the housing interior. The screw 50 is axially rotatable by means of motor 52 and right angle drive 54. A gas outlet pipe 56 extends through the top of housing 42 as shown, and communicates with the interior 48 of the housing. The pipe 56 may be directly vented to the atmosphere, or in preferred forms, is connected to vacuum pump 24, the latter being operated through the medium of motor 22.

Density measuring apparatus 18 is of conventional construction, and operates to allow essentially continuous or selective measurement of the bulk density of the subdivided extrudate from die 40. Such bulk density data can then be used in a feedback loop manner to increase or decrease the magnitude of the vacuum applied to the extruder barrel 36 via device 16. That is, if the bulk density is too low, the vacuum level may be increased; alternately, if the measured bulk density is too high, the level of vacuum may be decreased. In this connection, those skilled in the art will readily appreciate that controller 20 is of conventional design and operation, and may be a part of a more sophisticated microprocessor control system associated with the overall operation of system 10. In any case, it will be understood that provision of apparatus 18, controller 20, motor 22 and pump 24 allows selective control of the vacuum applied to barrel 36 in response to variations in the bulk density of the product emerging from the extruder.

Although not shown, the overall system 10 would also normally include a conventional dryer serving to dry the extrudate down to an acceptable moisture level for extended storage and use. A multiple-pass Wenger dryer can be employed to good effect. Additionally, the equipment may include coating apparatus for external coating of the extrudate with liquid fat.

The following examples set forth preferred procedures in accordance with the invention. These examples are provided as illustrations only, and nothing therein should be taken as a limitation upon the overall scope of the invention.

EXAMPLE

A large number of extrusion tests were carried out to fabricate various types of sinking aquatic feed pellets.

Table 1 sets forth the preconditioner, extruder and die and knife configurations employed in carrying out the tests of this example. In all cases, the parts numbers employed are Wenger Manufacturing, Inc. parts numbers for the respective pieces of equipment.

TABLE 1

| PRECONDITIONER CONFIGURATION | | | | | | | |
|---|---|---|---|---|---|---|---|
| LEFT SHAFT | | | | RIGHT SHAFT | | | |
| Quantity | Degree | Type | Position | Quantity | Degree | Type | Position |
| 12 | 75 | beater | forward | 12 | 75 | beater | forward |
| 24 | 90 | beater | neutral | 48 | −75 | beater | reverse |
| 24 | −75 | beater | reverse | — | — | — | — |

TABLE 1-continued

EXTRUDER CONFIGURATION #1

Heads            ROTATING ELEMENTS

| | | | | | |
|---|---|---|---|---|---|
| 1. 53916-001 | 1. 53657-003 | 6. 53624-105 F | 11. 52625-103 | 16. 53657-003 | 21. 53624-103 F | 26. 53626-007 |
| 2. 53907-001 | 2. 53657-003 | 7. 53624-105 O | 12. 53624-101 O | 17. 53657-003 | 22. 53624-105 F | 27. 53626-103 |
| 3. 53916-001 | 3. 53657-003 | 8. 53624-103 F | 13. 53624-105+ | 18. 53625-003 | 23. 53624-105 O | 28. 53626-003 |
| 4. 53907-001 | 4. 53624-101 O | 9. 53624-101 F | 14. 53624-101+ | 19. 53625-003 | 24. 53624-103 F | 29. 53626-103 |
| 5. 53919-001 | 5. 53625-103 F | 10. 53625-003 | 15. 53657-003 | 20. 53624-101 O | 25. 53624-101 F | 30. 53626-003 |

EXTRUDER SHAFT: 53622-003 RIGHT SHAFT: 1. 53657-203; 2. 53657-203            31. 53620-00

EXTRUDER CONFIGURATION #2

Heads            ROTATING ELEMENTS

| | | | | | | |
|---|---|---|---|---|---|---|
| 1. 53916-001 | 1. 53657-003 | 6. 53624-105 F | 11. 53624-101+ | 16. 53626-103 | 21. 53657-003 | 26. 53625-003 |
| 2. 53907-001 | 2. 53657-003 | 7. 53624-103 F | 12. 53624-105+ | 17. 53624-101 R | 22. 53657-003 | 27. 53625-003 |
| 3. 53916-001 | 3. 53657-003 | 8. 53624-101 F | 13. 53624-101+ | 18. 53624-103 R | 23. 53657-003 | 28. 53621-005 |
| 4. 53907-001 | 4. 53624-101 O | 9. 53625-003 | 14. 53624-105+ | 19. 53624-105 R | 24. 53625-003 | — |
| 5. 53919-001 | 5. 53624-103 F | 10. 53625-103 | 15. 53625-003 | 20. 53625-003 | 25. 53625-003 | — |

EXTRUDER SHAFT: 53622-003; RIGHT SHAFT: 1. 53657-203; 2. 53657-203; 3. 53657-203      31. 53620-00

DIE AND KNIFE CONFIGURATION #1

| KNIFE INFORMATION | DIES AND ADAPTORS | | |
|---|---|---|---|
| Knife Blade 19430-007 | 1. 53661-001 AD | 4. 74010-699 NA | 7. 74010-879 NA |
| No. of Knife Blades: 1 | 2. 74010-870 NA | 5. 31600-545 BT | 1 insert, 20 mm diameter |
| Knife Holder 19462-001 | 3. 74010-882 NA | 6. 74010-839 NA | |

DIE AND KNIFE CONFIGURATION #2

| KNIFE INFORMATION | DIES AND ADAPTORS | | |
|---|---|---|---|
| Knife Blade 19430-007 | 1. 53661-001 AD | 4. 74010-699 NA | 7. 74010-880 NA |
| No. of Knife Blades: 1 | 2. 74010-870 NA | 5. 31600-545 BT | 1 insert, 25 mm diameter |
| Knife Holder 19462-001 | 3. 74010-882 NA | 6. 74010-839 NA | |

DIE AND KNIFE CONFIGURATION #3

| KNIFE INFORMATION | DIES AND ADAPTORS | | |
|---|---|---|---|
| Knife Blade 19430-007 | 1. 53661-001 AD | 4. 74010-699 NA | 7. 74010-869 NA |
| No. of Knife Blades: 6 | 2. 74010-870 NA | 5. 31600-545 BT | 6 inserts, 6 mm diameter |
| Knife Holder 19462-001 | 3. 74010-882 NA | 6. 74010-839 NA | |

DIE AND KNIFE CONFIGURATION #4

| KNIFE INFORMATION | DIES AND ADAPTORS | | |
|---|---|---|---|
| Knife Blade 19430-007 | 1. 53661-001 AD | 4. 74010-699 NA | 7. 74010-879 NA |
| No. of Knife Blades: 1 | 2. 74010-870 NA | 5. 31600-545 BT | 1 insert 20 mm diameter |
| Knife Holder 19462-015 | 3. 74010-882 NA | 6. 74010-839 NA | |

DIE AND KNIFE CONFIGURATION #5

| KNIFE INFORMATION | DIES AND ADAPTORS | | |
|---|---|---|---|
| Knife Blade 19430-007 | 1. 53661-001 AD | 4. 74010-699 NA | 7. 74010-880 NA |
| No. of Knife Blades: 1 | 2. 74010-870 NA | 5. 31600-545 BT | 1 insert, 25 mm diameter |
| Knife Holder 19462-015 | 3. 74010-882 NA | 6. 74010-839 NA | |

DIE AND KNIFE CONFIGURATION #6

| KNIFE INFORMATION | DIES AND ADAPTORS | | |
|---|---|---|---|
| Knife Blade 19430-007 | 1. 53661-001 AD | 4. 74010-699 NA | 7. 74010-752 NA |
| No. of Knife Blades: 3 | 2. 74010-870 NA | 5. 31600-545 BT | 5 inserts, 6 mm diameter |
| Knife Holder 19462-015 | 3. 74010-882 NA | 6. 65421-001 BH | |

TABLE 1-continued

| DIE AND KNIFE CONFIGURATION #7 | | | |
|---|---|---|---|
| KNIFE INFORMATION | DIES AND ADAPTORS | | |
| Knife Blade 19430-007 | 1. 53660-001 AD | 4. 74010-803 NA | 7. — |
| No. of Knife Blades: 3 | 2. 28361-625 BH | 5. — | 10 inserts, 6 mm diameter |
| Knife Holder 19462-001 | 3. — | 6. — | |

In a first series of six extrusion tests, three separate starting dry ingredient recipes were employed. These recipes are set forth in Table 2.

TABLE 2

| Ingredients (% by wt.) | Recipe #1 | Recipe #2 | Recipe #3 |
|---|---|---|---|
| Fish Meal | 62.56 | 72.31 | 68.07 |
| Wheat Flour | 12.03 | — | 10.00 |
| Tapioca Starch (precooked) | 14.81 | 16.55 | 10.87 |
| Corn Gluten Meal | 5.00 | 5.00 | 5.00 |
| Minor Ingredients | 5.60 | 6.14 | 5.96 |
| TOTAL | 100 | 100 | 100 |

Table 3 sets forth the equipment and recipes used, as well as the recorded preconditioning, extrusion and final product information for Runs #1–6. In Table 3, "CW" refers to the fact that cold water was circulated through the jackets of the extruder barrel heads for cooling purposes; and the mid-barrel vacuum data refers to the magnitude of the vacuum drawn through the device 16 referred to above. Also, fish oil (sardine oil) was injected into the starting ingredients during preconditioning, at the rates described. In Runs #1–3 and 6, all of the total fish oil content was injected into the preconditioner and was deemed to be "internal"; in Runs #4 and 5, a proportion of the total fish oil content was injected into the preconditioner as internal fish oil, and another proportion was applied externally to the pellets after drying thereof.

TABLE 3

| | | Run #1 | Run #2 | Run #3 | Run #4 | Run #5 | Run #6 |
|---|---|---|---|---|---|---|---|
| DRY RECIPE INFORMATION | | | | | | | |
| Dry Recipe Moisture | % wb | 7.19 | 7.19 | 7.19 | 7.19 | 7.19 | 7.19 |
| Dry Recipe Rate | kg/hr. | 950 | 610 | 700 | 650 | 650 | 950 |
| Feed Screw Speed | rpm | 66 | 39 | — | 41 | 44 | 69 |
| PRECONDITIONING INFORMATION | | | | | | | |
| Preconditioner Speed | rpm | 250 | 250 | 250 | 250 | 250 | 250 |
| Steam Flow to Preconditioner | kg/hr. | 85 | 55 | 70 | 84 | 84 | 133 |
| Water Flow to Preconditioner | kg/hr. | 162 | 104 | 119 | 117 | 117 | 171 |
| Preconditioner Fish Oil Rate | kg/hr. | 167 | 107 | 123 | 114 | 60 | 167 |
| Preconditioner Discharge Temperature | °C. | 83 | 81 | — | 94 | 92 | 97 |
| Moisture Entering Extruder | % wb | 21.21 | 20.98 | 21.17 | 24.10 | 21.09 | 20.69 |
| EXTRUSION INFORMATION | | | | | | | |
| Extruder Shaft Speed | rpm | 404 | 404 | 404 | 404 | 404 | 404 |
| Extruder Motor Load | % | 36 | 33 | — | 32 | 35 | 32 |
| Water Flow to Extruder (barrel injection) | kg/hr. | 95 | 55 | 56 | 78 | 78 | 57 |
| Steam Flow to Extruder (barrel injection) | kg/hr. | 0 | 0 | 49 | 32 | 31 | 76 |
| Control/Temperature 1st Head | °C. | CW/59 | CW/56 | CW/56 | CW/64 | CW/61 | CW/66 |
| Control/Temperature 2nd Head | °C. | CW/43 | CW/41 | CW/41 | CW/58 | CW/51 | CW/59 |
| Control/Temperature 3rd Head | °C. | CW/49 | CW/47 | CW/47 | CW/49 | CW/47 | CW/50 |
| Control/Temperature 4th Head | °C. | CW/82 | CW/73 | CW/73 | CW/74 | CW/82 | CW/82 |
| Control/Temperature 5th Head | °C. | CW/73 | CW/70 | CW/70 | CW/68 | CW/68 | CW/73 |

TABLE 3-continued

|  |  | Run #1 | Run #2 | Run #3 | Run #4 | Run #5 | Run #6 |
|---|---|---|---|---|---|---|---|
| Mid-Barrel Vacuum | in. Hg | — | — | — | 11 | 11 | 10 |
| 5th Head/Pressure | kPa | 1520 | 1380 | — | 1030 | 1380 | 1720 |
| Knife Drive Speed | rpm | 1455 | 1748 | — | 1065 | 837 | — |
| FINAL PRODUCT INFORMATION | | | | | | | |
| Extruder Discharge Moisture | % wb | 26.58 | 26.11 | 26.74 | 28.83 | 31.87 | 25.16 |
| Extruder Discharge Rate | kg/hr. | — | — | — | 1034 | 1006 | 1554 |
| Extruder Discharge Density | kg/m$^3$ | 593 | — | 641 | 655 | 641 | 593 |
| Extruder Performance | | Stable | Stable | Stable | Stable | Stable | Stable |
| REFERENCE INFORMATION | | | | | | | |
| Recipe No. | | 1 | 1 | 2 | 3 | 3 | 1 |
| Extruder Configuration | | 1 | 1 | 2 | 2 | 2 | 2 |
| Die and Knife Configuration | | 2 | 1 | 1 | 3 | 3 | 2 |

A second set of extruder tests were also conducted (Runs #7–30) using a series of different recipes and conditions. The individual recipes employed basic Formulas A or B (Table 4, and the complete recipes (Nos. 4–23) are set forth in Table 5

TABLE 4

Basic Formulae

| Ingredients (% By Wt.) | Formula A | Formula B |
|---|---|---|
| Fish Meat | 76.47 | 83.30 |
| Wheat Flour | 14.71 | — |
| Vitamin/Nutrient Mixture | 2.94 | 3.37 |
| Tapioca Starch (precooked) | 5.88 | 13.33 |
|  | 100 | 100 |

The equipment used, extrusion conditions recorded, and product properties are set forth in Table 6 In Runs #7 and 17, a proportion of the total fish oil was applied externally after drying of the pellets; in all other runs, the total fish oil content was injected into the preconditioner. In Runs #8 and 17, a part of each test was carried out without vacuum, merely venting the atmosphere; the products produced without vacuum treatment were less desirable.

TABLE 5

Ingredients % By Wt.

| Recipe # | Formula A | Formula B | Wheat Flour | Corn Gluten | Rework[1] | Tapioca Starch (precooked) | Minor Ingredients |
|---|---|---|---|---|---|---|---|
| 4 | — | 81.73 | 9.97 | 5.00 | — | — | 3.30 |
| 5 | — | 81.42 | 5.00 | 5.00 | 5.00 | — | 3.59 |
| 6 | — | 76.39 | 5.00 | 5.00 | 10.00 | — | 3.61 |
| 7 | — | 79.70 | — | 5.00 | 5.00 | 7.00 | 3.30 |
| 8 | — | 79.70 | — | 5.00 | 5.00 | 7.00 | 3.30 |
| 9 | — | 76.73 | — | 5.00 | 10.00 | 6.98 | 1.30 |
| 10 | 82.67 | — | — | 5.01 | 5.01 | 5.01 | 1.20 |
| 11 | 84.68 | — | — | 5.00 | 5.00 | 5.00 | 0.31 |
| 12 | 79.27 | — | 10.21 | 5.10 | 5.10 | — | 0.30 |
| 13 | 81.73 | — | 7.43 | 5.26 | 5.26 | — | 0.32 |
| 14 | 83.72 | — | — | 5.39 | 5.39 | 5.39 | 0.11 |
| 15 | 84.68 | — | — | 5.00 | 5.00 | 5.00 | 0.31 |
| 16 | 84.68 | — | 5.00 | 5.00 | 5.00 | — | 0.31 |
| 17 | 88.74 | — | 1.01 | 4.97 | 4.97 | — | 0.30 |
| 18 | — | 82.87 | — | 5.02 | 5.02 | 7.00 | 0.08 |
| 19 | — | 87.90 | — | 4.99 | 4.99 | 2.00 | 0.11 |
| 20 | — | 84.90 | — | 5.00 | 5.00 | 5.00 | 0.10 |
| 21 | — | 89.95 | — | 4.97 | 4.97 | — | 0.10 |
| 22 | 85.90 | — | — | 5.00 | 5.00 | — | 4.10 |
| 23 | — | 84.88 | — | 5.01 | 5.01 | 5.01 | 0.10 |

TABLE 6

| | | Run #7 | Run #8 | Run #9 | Run #10 | Run #11 | Run #12 | Run #13 | Run #14 | Run #15 | Run #16 | Run #17 | Run #18 |
|---|---|---|---|---|---|---|---|---|---|---|---|---|---|
| DRY RECIPE INFORMATION | | | | | | | | | | | | | |
| Dry Recipe Density | kg/m³ | 481 | 481 | 481 | 481 | 481 | 481 | 487 | 481 | 481 | 481 | 481 | 481 |
| Dry Recipe Rate | kg/hr. | 700 | 700 | 700 | 700 | 700 | 700 | 700 | 700 | 700 | 950 | 950 | 950 |
| Feed Screw Speed | rpm | 45 | 46 | 45 | 44 | 42 | 43 | 42 | 41 | 42 | 62 | 57 | 64 |
| PRECONDITIONING INFORMATION | | | | | | | | | | | | | |
| Preconditioner Speed | rpm | 250 | 250 | 250 | 250 | 250 | 250 | 250 | 250 | 250 | 250 | 250 | 250 |
| Steam Flow to Preconditioner | kg/hr. | 77 | 77 | 77 | 77 | 77 | 70 | 70 | 70 | 70 | 123 | 123 | 85 |
| Water Flow to Preconditioner | kg/hr. | 91 | 95 | 98 | 105 | 112 | 112 | 112 | 98 | 98 | 143 | 143 | 142 |
| Preconditioner Fish Oil Rate | kg/hr. | 190 | 233 | 154 | 154 | 175 | 125 | 116 | 116 | 168 | 90 | 90 | 90 |
| Preconditioner Discharge Temperature | °C. | 91 | 89 | 86 | 86 | 83 | 94 | 94 | 95 | — | 90 | 90 | 82 |
| Moisture Entering Extruder | % wb | 20.12 | — | 19.96 | 21.68 | 21.01 | 21.06 | 20.53 | 20.14 | 19.88 | 19.08 | — | 20.65 |
| EXTRUSION INFORMATION | | | | | | | | | | | | | |
| Extruder Shaft Speed | rpm | 434 | 434 | 430 | 430 | 434 | 432 | 431 | 432 | 428 | 425 | 425 | 405 |
| Extruder Motor Load | % | 30 | 30 | 31 | 31 | 31 | 31 | 31 | 33 | 31 | 32 | 35 | 36 |
| Water Flow to Extruder (barrel injection) | kg/hr. | 32 | 49 | 56 | 49 | 51 | 49 | 49 | 35 | 35 | 47 | 68 | 57 |
| Steam Flow to Extruder (barrel injection) | kg/hr. | 91 | 56 | 72 | 78 | 74 | 63 | 65 | 63 | 61 | 85 | 25 | 24 |
| Control/Temperature 1st Head | °C. | CW/66 | CW/63 | CW/63 | CW/63 | CW/60 | CW/61 | CW/60 | CW/60 | CW/61 | CW/63 | CW/65 | CW/55 |
| Control/Temperature 2nd Head | °C. | CW/55 | CW/57 | CW/56 | CW/55 | CW/55 | CW/52 | CW/51 | CW/55 | CW/53 | CW/57 | CW/54 | CW/50 |
| Control/Temperature 3rd Head | °C. | CW/62 | CW/66 | CW/51 | CW/51 | CW/84 | CW/48 | CW/45 | CW/47 | CW/48 | CW/52 | CW/54 | CW/55 |
| Control/Temperature 4th Head | °C. | CW/92 | CW/69 | CW/65 | CW/69 | CW/71 | CW/69 | CW/68 | CW/72 | CW/69 | CW/96 | CW/92 | CW/76 |
| Control/Temperature 5th Head | °C. | CW/69 | CW/56 | CW/62 | CW/63 | CW/63 | CW/64 | CW/66 | CW/70 | CW/67 | CW/71 | CW/71 | CW/65 |
| Mid-Barrel Vacuum | in. Hg | 8 | 10 | — | 10 | 11 | 11 | 12 | 12 | 12 | 9 | 10 | 11 |
| 5th Head/Pressure | kPa | 860 | — | — | 340 | 340 | 340 | 690 | 520 | 340 | 1380 | 130 | 1900 |
| Die Pressure | psi | 428 | — | — | 345 | 379 | 379 | 413 | 551 | 413 | 413 | 345 | 448 |
| Knife Drive Speed | rpm | 1293 | 1293 | 1585 | — | 1455 | — | 1357 | 1390 | 1422 | 1065 | 1065 | 1130 |
| FINAL PRODUCT INFORMATION | | | | | | | | | | | | | |
| Extruder Discharge Moisture | % wb | 26.02 | — | 25.10 | 26.87 | 24.84 | 25.03 | 28.39 | 27.24 | 24.50 | 26.86 | 27.42 | 28.84 |
| Extruder Discharge Rate | kg/hr. | 853 | — | — | 657 | 1000 | — | — | — | — | 1336 | — | — |
| Extruder Discharge Density | kg/m³ | 577 | 609 | 577 | — | 689 | 689 | 689 | 689 | 689 | 673 | 689 | 689 |
| Dryer Discharge Moisture | % wb | — | — | — | 561 | 15.07 | 14.03 | 15.31 | 13.78 | 12.42 | 14.90 | 16.58 | 17.62 |
| Dryer Discharge Density | kg/m³ | 577 | 609 | 577 | 561 | 577 | 577 | 609 | 593 | 593 | 609 | 625 | 641 |
| Extruder Performance | | Stable | Stable | Stable | Stable | Stable | Stable | Stable | Stable | Stable | Stable | Stable | Stable |
| REFERENCE INFORMATION | | | | | | | | | | | | | |
| Recipe No. | | 4 | 4 | 5 | 6 | 7 | 8 | 8 | 9 | 9 | 10 | 11 | 12 |
| Extruder Configuration | | 2 | 2 | 2 | 2 | 2 | 2 | 2 | 2 | 2 | 2 | 2 | 2 |
| Die and Knife Configuration | | 4 | 4 | 4 | 4 | 4 | 4 | 4 | 4 | 4 | 5 | 5 | 5 |

TABLE 6-continued

| | | Run #19 | Run #20 | Run #21 | Run #22 | Run #23 | Run #24 | Run #25 | Run #26 | Run #27 | Run #28 | Run #29 | Run #30 |
|---|---|---|---|---|---|---|---|---|---|---|---|---|---|
| DRY RECIPE INFORMATION | | | | | | | | | | | | | |
| Dry Recipe Density | kg/m³ | 481 | 481 | — | 481 | 481 | 481 | 481 | 481 | 481 | 481 | 481 | 481 |
| Dry Recipe Rate | kg/hr. | 950 | 950 | 700 | 700 | 700 | 600 | 600 | 600 | 600 | 700 | 700 | 700 |
| Feed Screw Speed | rpm | 61 | 56 | 42 | 41 | 44 | 38 | 36 | 36 | 37 | 41 | 40 | 45 |
| PRECONDITIONING INFORMATION | | | | | | | | | | | | | |
| Preconditioner Speed | rpm | 250 | 250 | 250 | 250 | 250 | 250 | 250 | 250 | 250 | 250 | 250 | 250 |
| Steam Flow to Preconditioner | kg/hr. | 85 | 85 | 63 | 64 | 66 | 54 | 48 | 48 | 41 | 84 | 84 | 77 |
| Water Flow to Preconditioner | kg/hr. | 142 | 143 | 105 | 105 | 105 | 90 | 90 | 102 | 108 | 105 | 105 | 91 |
| Preconditioner Fish Oil Rate | kg/hr. | 91 | 90 | 66 | 66 | 16 | 144 | 144 | 144 | 145 | 113 | 113 | 168 |
| Preconditioner Discharge Temperature | °C. | 98 | 90 | 91 | 92 | 94 | 80 | 83 | 86 | 83 | 86 | 94 | 95 |
| Moisture Entering Extruder | % wb | 21.93 | 22.87 | 21.41 | 21.54 | 20.70 | — | — | 22.27 | — | 21.71 | 20.51 | — |
| EXTRUSION INFORMATION | | | | | | | | | | | | | |
| Extruder Shaft Speed | rpm | 406 | 400 | 400 | 401 | 400 | 377 | 377 | 380 | 376 | 450 | 451 | 430 |
| Extruder Motor Load | % | 36 | 35 | 32 | 32 | 33 | 33 | 34 | 33 | 33 | 31 | 29 | 32 |
| Water Flow to Extruder (barrel injection) | kg/hr. | 57 | 57 | 42 | 42 | 42 | 45 | 48 | 90 | 96 | 84 | 91 | 32 |
| Steam Flow to Extruder (barrel injection) | kg/hr. | 24 | 24 | 21 | 21 | 21 | 0 | 0 | 0 | 0 | 77 | 77 | 77 |
| Control/Temperature 1st Head | °C. | CW/45 | CW/60 | CW/57 | CW/60 | CW/60 | CW/55 | CW/55 | CW/58 | CW/58 | CW/61 | CW/61 | CW/66 |
| Control/Temperature 2nd Head | °C. | CW/50 | CW/50 | CW/52 | CW/51 | CW/51 | CW/48 | CW/46 | CW/45 | CW/45 | CW/53 | CW/55 | CW/62 |
| Control/Temperature 3rd Head | °C. | CW/55 | CW/56 | CW/55 | CW/56 | CW/55 | CW/45 | CW/43 | CW/44 | CW/45 | CW/46 | CW/52 | CW/51 |
| Control/Temperature 4th Head | °C. | CW/50 | CW/78 | CW/73 | CW/70 | CW/69 | CW/71 | CW/66 | CW/69 | CW/69 | CW/69 | CW/95 | CW/75 |
| Control/Temperature 5th Head | °C. | CW/40 | CW/68 | CW/66 | CW/67 | CW/68 | CW/56 | CW/56 | CW/57 | CW/56 | CW/64 | CW/64 | CW/65 |
| Mid-Barrel Vacuum | in Hg | 11 | 11 | 11 | 11 | 11 | 10.5 | 12 | 12 | 15 | 11 | Vent only No Vac. | 10 |
| 5th Head/Pressure | kPa | 1900 | 1790 | 1720 | 1580 | 1720 | 1380 | 1030 | 860 | 690 | 690 | 620 | 1210 |
| Die Pressure | psi | 449 | 427 | 517 | 517 | 482 | 620 | 689 | 551 | 551 | 551 | — | 413 |
| Knife Drive Speed | rpm | 1130 | 1130 | 1748 | 1650 | 1650 | — | 545 | 675 | 935 | 1000 | 1552 | 1357 |
| FINAL PRODUCT INFORMATION | | | | | | | | | | | | | |
| Extruder Discharge Moisture | % wb | 27.31 | 27.25 | 27.52 | 27.49 | 26.24 | — | 26.43 | 28.56 | — | 30.97 | 31.58 | — |
| Extruder Discharge Rate | kg/hr. | 1298 | — | 983 | — | — | — | — | — | — | — | — | — |
| Dryer Discharge Moisture | % wb | 17.44 | 18.77 | 10.17 | 10.24 | — | 15.20 | 12.37 | 15.26 | — | 15.34 | 11.89 | 12.37 |
| Dryer Discharge Density | kg/m³ | 673 | 657 | 593 | 561 | 561 | 625 | 577 | 609 | 593 | 641 | 577 | 593 |
| Extruder Discharge Density | kg/m³ | 689 | 689 | 689 | 389 | 389 | — | 785 | 753 | 753 | — | 721 | 689 |
| Extruder Performance | | Stable | Stable | Stable | Stable | Stable | Stable | Stable | Stable | Stable | Stable | Stable | Stable |
| REFERENCE INFORMATION | | | | | | | | | | | | | |
| Recipe No. | | 13 | 14 | 15 | 16 | 17 | 18 | 20 | 19 | 21 | 22 | 22 | 23 |
| Extruder Configuration | | 2 | 2 | 2 | 2 | 2 | 2 | 2 | 2 | 2 | 2 | 2 | 2 |
| Die and Knife Configuration | | 5 | 5 | 4 | 4 | 4 | 6 | 6 | 6 | 6 | 6 | 7 | 4 |

The following table gives the final ingredient makeup and properties of the feed pellets produced in Runs #7–30.

TABLE 7

| Ingredients (% by wt.) | Run No. | | | | | | | | | | | | | | | |
|---|---|---|---|---|---|---|---|---|---|---|---|---|---|---|---|---|
| | 7 | 8 | 9 | 10 | 11 | 12 | 13 | 14 | 15 | 16 | 17 | 18 | 19 | 20 | 21 | 22 |
| Fish Meal | 51.5 | 51.5 | 52.74 | 48.95 | 50.06 | 47.10 | 48.56 | 49.74 | 50.06 | 43.20 | 48.72 | 49.78 | 52.62 | 50.93 | 49.81 | 50.74 |
| Added Fish Oil | 20 | 20 | 20 | 20 | 20 | 20 | 20 | 20 | 20 | 30 | 25 | 25 | 25 | 25 | 22 | 20 |
| Internal Fish Oil | 7 | 7 | 7 | 7 | 7 | 7 | 7 | 7 | 7 | 7 | 7 | 7 | 7 | 7 | 7 | 7 |
| Total Fish Oil | 27 | 27 | 27 | 27 | 27 | 27 | 27 | 27 | 27 | 37 | 32 | 32 | 32 | 32 | 37 | 37 |
| Wheat Flour | 0 | 0 | 0 | 9.42 | 9.63 | 16.51 | 14.73 | 9.57 | 9.63 | 11.46 | 10.05 | 0 | 0 | 0 | 0 | 9.76 |
| Tapioca Starch | 13.3 | 13.3 | 13.5 | 8.86 | 7.49 | 3.62 | 3.73 | 7.76 | 7.49 | 3.32 | 3.74 | 12.73 | 9.78 | 11.55 | 7.97 | 3.89 |
| Corn Gluten Meal | 3.6 | 3.6 | 3.6 | 3.6 | 3.6 | 3.72 | 3.83 | 3.93 | 3.6 | 3.15 | 3.38 | 3.41 | 3.39 | 3.4 | 3.13 | 3.65 |
| Minor Ingredients | 4.5 | 4.5 | 3.41 | 3.1 | 2.14 | 2.02 | 1.86 | 1.99 | 2.15 | 1.86 | 2.08 | 1.85 | 2.2 | 2.12 | 2.04 | 4.94 |
| Moisture | 9.1 | 8.7 | 9.6 | 9.1 | 7.7 | 8.1 | 9 | 8.7 | 8.8 | 8.1 | 9.3 | 10.1 | 6.5 | 6.4 | 6.5 | 7.8 |
| Bulk Density (kg/cm) | 577 | 609 | 577 | 561 | 577 | 609 | 593 | 593 | 609 | 625 | 609 | 625 | 641 | 673 | 657 | 593 |
| Specific Gravity | — | — | — | — | — | — | — | — | — | — | — | — | — | — | — | 0.9 |
| Length/Diameter | — | — | — | — | — | — | — | — | — | — | — | — | — | — | — | 7.8/6.6 |

| Ingredients (% by wt.) | Run No. | | | | | | | |
|---|---|---|---|---|---|---|---|---|
| | 23 | 24 | 25 | 26 | 27 | 28 | 29 | 30 |
| Fish Meal | 58.10 | 37.10 | 44.10 | 39.50 | 45.20 | 47.20 | 56.60 | 41.30 |
| Added Fish Oil | 15 | 27 | 20 | 20 | 20 | 20 | 22 | 27 |
| Internal Fish Oil | 7 | 7 | 7 | 7 | 7 | 7 | 7 | 7 |
| External Fish Oil | 22 | 34 | 27 | 27 | 27 | 27 | 22 | 25 |
| Wheat Flour | 0 | 9.45 | 9.45 | 12.1 | 10 | 10 | 0 | 10 |
| Tapioca Starch | 13.25 | 13.6 | 13.6 | 9.9 | 7.9 | 6.5 | 15.8 | 10.5 |
| Corn Gluten Meal | 3.91 | 3.91 | 3.83 | 3.83 | 3.83 | 3.83 | 3.83 | 3.83 |
| Minor Ingredients | 2.44 | 1.99 | 1.99 | 4.05 | 4.05 | 4.05 | 4.05 | 4.05 |
| Moisture | 6.17 | 7.5 | 10.7 | 9.9 | 9.6 | 9.6 | 9.6 | 7.8 |
| Bulk Density (kg/cm) | 561 | 625 | 577 | 609 | 641 | 577 | 609 | 593 |
| Specific Gravity | 0.87 | — | — | — | — | 1.2 | 1.23 | — |
| Length/Diameter | 8.1/6.4 | — | — | — | — | 8.7/5.0 | 9.2/6.0 | — |

An additional two extrusion runs were conducted in a manner similar to those described in detail above. During the course of each run, the mid-barrel vacuum source was turned off to determine the effect upon the ultimate pellets. In the first run (Run #31), recipe #11 (with 15% internal fat), extruder configuration #2, and die and knife configuration #5 were employed, along with the same preconditioner configuration of the previous examples. During the bulk of Run #31, the mid-barrel device was operated at 10 inches Hg of vacuum. In the middle of the run for a period of about 5 minutes, the vacuum source was turned off, causing rapid barrel heating. Products from the vacuum-on and vacuum-off portions of the run were collected and were analyzed for fines. During the vacuum-off stage, the products exhibited 15.78% by weight fines, while in the vacuum-on stage, the fines were only 5.13% by weight.

In another comparative run (Run #32), recipe #4 was used (with 30% total internal fat), using the above preconditioner configuration, extruder configuration #2 and die and knife configuration #4. During the majority of the run, the mid-barrel vacuum device was maintained at 10 inches Hg but as above for a short period the vacuum was turned off. The resultant products from the vacuum-off stage exhibited 91.15% by weight fines, while the vacuum-on products had only 19.05% by weight fines.

The test procedure used to determine fines is set forth in *Feed Manufacturing Technology IV*, American Feed Industry Association, Inc., 1994, p. 122, which is incorporated by reference herein.

We claim:

1. A method of preparing a high protein, high fat sinking aquatic feed comprising the steps of:

providing a starting mixture including from about 15–55% by weight protein and at least about 1% by weight starch, said starch being present as a separated free component;

preconditioning said starting mixture by adding moisture thereto and subject the starting mixture to conditions of heat and agitation; and passing the preconditioned starting mixture into and through an extruder having an elongated barrel with an elongated, axially rotatable, flighted screw therein and an endmost extrusion die to form a self-sustaining extrudate having a specific gravity of greater than 1, said passing step including the steps of creating a condition of reduced pressure at a zone along the length of and within said barrel upstream of said die for densifying the preconditioned starting mixture within said barrel, said method further including the step of adding fat to said starting mixture and/or extrudate so that the extrudate has a total fat content of from about 10–40% by weight.

2. The method of claim 1, including the step of measuring a density value of said extrudate, and adjusting the magnitude of said reduced pressure in response to said density value measurement.

3. The method of claim 2, wherein said density value is bulk density.

4. The method of claim 1, including the step of adding liquid fat to said starting mixture during said preconditioning step.

5. The method of claim 1, including the step of subjecting said starting mixture to a temperature of from about 75°–98° C. for a period of from about 150–200 seconds during said preconditioning step.

6. The method of claim 1, including the step of adding fat to said starting mixture during said preconditioning step.

7. The method of claim 1, including the step of applying fat to said extrudate as a surface coating.

8. The method of claim 1, including the step of adjusting the moisture content of said extrudate to a level of from about 25–32% by weight.

9. The method of claim 1, including the step of subjecting said preconditioned starting material to conditions of pressure and shear during passage thereof through said extruder.

10. The method of claim 9, wherein preconditioned starting mixture is heated to a temperature of from about 50°–95° C. in said barrel, and subjected to a maximum pressure of from about 100–500 psi therein.

11. The method of claim 9, wherein said material is heated to a predetermined maximum temperature prior to reaching said zone.

12. The method of claim 1, said creating step comprising drawing a partial vacuum in said zone.

13. The method of claim 11, said partial vacuum having a magnitude of from about 2–15 inches Hg.

14. The method of claim 1, including the step of drying said extrudate.

15. An extrusion method comprising the steps of:

providing an edible starting mixture;

passing said starting mixture into and through an extruder having an elongated barrel with an elongated axially rotatable, flighted screw therein and an endmost extruder die to form an extrudate, said passing step including the step of creating a condition of reduced pressure at a zone along the length of and within said barrel upstream of said die;

measuring a density value of said extrudate, and adjusting the magnitude of said reduced pressure in response to said density value measurement.

16. The method of claim 15, wherein said material is heated to a predetermined maximum temperature prior to reaching said zone.

17. The method of claim 16, including the step of measuring the bulk density of said extrudate.

* * * * *